United States Patent [19]
Yang et al.

[11] Patent Number: 5,257,264
[45] Date of Patent: Oct. 26, 1993

[54] AUTOMATICALLY DEACTIVATED NO-OWNER FRAME REMOVAL MECHANISM FOR TOKEN RING NETWORKS

[75] Inventors: Henry S. Yang, Andover; Kadangode K. Ramakrishnan, Maynard, both of Mass.

[73] Assignee: Digital Equipment Corporation, Maynard, Mass.

[21] Appl. No.: 736,836

[22] Filed: Jul. 29, 1991

Related U.S. Application Data

[63] Continuation-in-part of Ser. No. 558,961, Jul. 27, 1990, which is a continuation-in-part of Ser. No. 400,072, Aug. 29, 1989, abandoned.

[51] Int. Cl.⁵ ............................................. H04L 12/42
[52] U.S. Cl. .................................................. 370/85.5
[58] Field of Search .................. 370/85.5, 85.4, 85.2, 370/85.15, 13; 340/825.05

[56] References Cited

U.S. PATENT DOCUMENTS

| | | | |
|---|---|---|---|
| 4,468,734 | 8/1984 | Lanier et al. | 364/200 |
| 4,507,777 | 3/1985 | Tucker et al. | 370/16 |
| 4,567,590 | 1/1986 | Bederman | 370/86 |
| 4,577,313 | 3/1986 | Sy | 370/85.14 |
| 4,646,232 | 2/1987 | Chang et al. | 364/200 |
| 4,789,982 | 12/1988 | Coden | 370/85 |
| 4,932,023 | 6/1990 | Geyer et al. | 370/85.4 |
| 4,941,142 | 7/1990 | Kida | 370/85.5 |
| 5,053,946 | 8/1991 | Jain | 364/200 |
| 5,142,530 | 8/1992 | Geyer et al. | 370/85.5 |

FOREIGN PATENT DOCUMENTS

| | | |
|---|---|---|
| 0119003A3 | 9/1984 | European Pat. Off. . |
| 0328004 | 8/1989 | European Pat. Off. . |
| 0328004A1 | 8/1989 | European Pat. Off. . |
| 0354809A2 | 2/1990 | European Pat. Off. . |
| 3507618.6 | 9/1986 | Fed. Rep. of Germany . |
| 91/03898 | 3/1991 | PCT Int'l Appl. . |

OTHER PUBLICATIONS

PCT International Search Report, dated Oct. 21, 1992, International Application No. PCT/US92/06264.
National Telecommunications Conference. Vol. 1, Dec. 1981, New Orleans, LO., US. W. Bux et al. "A Reliable Token-Ring System for Local Area Communication" pp. A2.2.1-A2.2.1.
Data Communications. Vol. 13, No. 9, Aug. 1984, New York, NY US, pp. 125-139; J. Bartik; "IBM's token ring: Have the pieces finally come together?", see p. 131, left-hand column, lines 3-13, see p. 135, left-hand column, line 17—p. 136, left-hand column, line 10.
Pending application for U.S. Patent Serial No. 07/884,321, of Yang et al, filed May 11, 1992, originally filed Aug. 12, 1988, "Frame Removal Mechanism for Token Ring Networks".

*Primary Examiner*—Wellington Chin
*Attorney, Agent, or Firm*—A. Signey Johnston; Albert P. Cefalo; Barry N. Young

[57] ABSTRACT

A purging station selected for removal of no-owner frames in a token ring network, and a corresponding method for its operation. The purging station initiates a purge cycle only if the network is not "idle" and, optionally, only if the network is not "near fully loaded," these terms being defined in relation to a token cycle. Therefore, no unnecessary purge marker frames are transmitted onto the network when it is idle or near fully loaded. Once purging is initiated, the purging station transmits at least one purge marker frame onto the ring network, and strips data received from the ring until a purge termination flag is set, upon detection of a received purge marker frame, a received token, or detection of a ring re-initialization procedure.

26 Claims, 4 Drawing Sheets

| EVENTS THAT CLEAR THE INITIATE-PURGE FLAG: |
|---|
| 1. TRANSMITTING THE TOKEN. |
| 2. THE RING'S BECOMING INOPERATIVE. |
| |
| EVENTS THAT SET THE INITIATE-PURGE FLAG: |
| 1. REPEATING OR RECEIVING A FRAME OTHER THAN AN ERROR-FREE PURGE MARKER FRAME. |
| 2. DETECTING A FORMAT ERROR. |
| 3. RECEIVING A FRAME FRAGMENT LONGER THAN A SELECTED LENGTH. |

FIG. 5

AUTOMATICALLY DEACTIVATED NO-OWNER FRAME REMOVAL MECHANISM FOR TOKEN RING NETWORKS

CROSS-REFERENCE TO RELATED APPLICATIONS

This application is a continuation-in-part of patent application Ser. No. 07/558,961, filed Jul. 27, 1990, entitled "No-Owner Frame and Multiple Token Removal Mechanism for Token Ring Networks," which is a continuation-in-part of patent application Ser. No. 07/400,072, filed Aug. 29, 1989, abandoned, having the same title.

BACKGROUND OF THE INVENTION

1. Field of the Invention

The invention relates generally to the field of computer networks comprising a plurality of stations which communicate data in a ring using a token-based protocol and, more specifically, to a mechanism for removing extraneous or erroneous data or ring control information from the network.

2. Description of the Prior Art

A computer network enables various devices, such as processors, mass storage devices, and printers, to communicate with each other over high speed communication links. The devices are connected, that is, coupled, to the network, and thus transfer data to and from the network through stations. The stations are interconnected by the communication links.

One example of such a network is a Local Area Network (LAN). A LAN allows high-bandwidth communication among devices within a limited geographic area. The communication links are typically composed of optical fibers, coaxial cable or twisted conductor pairs.

LANs may be configured as rings, with network stations transmitting data in one direction around the ring. Thus, when a station transmits data onto the ring, the data travels around the ring from station to station, with each station receiving the data from the preceding station and repeating it to the succeeding station, until the data reaches the station that is to receive it. In a well known ring network the receiving, or destination, station also repeats the data to its downstream successor and the data thus continues around the ring to the originating, or source, station.

The stations operate in accordance with communication protocols which facilitate the orderly transfer of data over the communication links. One type of communication protocol is a token ring system. Such systems use a token, that is, a specific string of bits, to indicate that a transmitting station has completed its transmission. A succeeding station may then, following the dictates of the protocol, begin transmitting data upon receipt of the token.

In a token ring system a station may not transmit data over the ring unless it actually holds the token. Thus if a station has data to transmit around the ring, the station removes the token from the ring data stream, that is, the station "captures" the token when it is received from the preceding station. The capturing station then begins its data transmission. When the station is finished with the data transmission it retransmits the token, effectively releasing it. The succeeding stations thereafter transfer the token around the ring until it is again captured by a station wishing to make a transmission.

Network stations transmit and receive data in the form of frames. The frames contain, in addition to the data, addresses, an error detection sequence and status flags, for example, a flag indicating receipt of the frame by the intended receiving, or destination, station. The frame addresses identify the source station and destination station or stations.

Every station and every attached device is identified by a unique address. Thus each station has associated with it its unique station-address and the addresses of its attached devices The stations may also have other addresses, for example, logical addresses, associated with them. A frame directed from a source station to a single destination station thus contains the address of the source station and, for example, the address of a specific device attached to the destination station. Each station may maintain a list of its associated addresses, such that the station receives the frames containing any one of its addresses.

A destination station, in addition to repeating the frame to its succeeding station, copies the frame for use by the appropriate device(s) associated with the station. The destination station may also set the applicable status flags indicating receipt of the frame.

When the frame has returned to the source station, the station, recognizing the frame as its own, for example, by recognizing the source address in the frame as its own, removes, or strips, the frame from the ring data stream. After a transmission, the first frames received by the source station over the ring are the frames it transmitted, assuming proper operation of the stations on the ring.

Frames may be altered by bit errors as they travel around the ring. The alteration may affect the source addresses in a number of frames, rendering them unrecognizable to the source stations The source stations will not then strip frames, and these frames will travel continuously around the ring. Thus a station listed as a destination station will repeatedly receive and process the frames. The processing will ordinarily detect the duplication, but it does require the use of station resources that might conflict with or delay other operations of the station.

A similar situation occurs when a station which has transmitted frames onto the ring becomes inoperative before it strips the transmitted frames. These frames, like the frames with altered source addresses, continuously travel around the ring because none of the stations then operating on the ring recognize the frames as their own and strip them. Accordingly, these frames, the altered-address frames and any other frames continuously traversing the ring are commonly referred to as "no-owner" frames. These frames may cause processing backlogs in the destination stations because the stations must process them each time they are received. The no-owner frames often require frequent and fast processing because they return to the destination stations in the time it takes the frames to traverse the ring, which is typically faster than frames are ordinarily received. Thus it is desirable to rid the ring of no-owner frames.

A mechanism to purge no-owner frames from rings operating under the IEEE 802.5 standard protocol involves stripping all data from the ring, and then re-initializing the ring. Re-initializing the ring causes it to perform all actions necessary to restart the ring and make it operational. For example, the initialization includes a claim token operation and the creation of a new token. The claim token operation involves an arbitration process during which the winner of arbitration, also called the claim token winner, creates the new token. Ring re-initialization may take a considerable period of time and result in lost performance during this period. Thus, for performance considerations, ring re-initializations should be performed as infrequently as possible.

To detect a no-owner frame, that is, to determine when a ring re-initialization is necessary, a station, referred to in the IEEE 802.5 standard protocol as an Active Monitor, places a marker at the beginning of each frame it repeats over the ring. If the Active Monitor thereafter detects a frame containing a marker, indicating that the frame traveled completely around the ring without being stripped, it begins a purge operation which includes a ring re-initialization. The marker is not protected by the frame error detection sequence. Thus an error in the marker may either start a purging operation unnecessarily or prevent one from occurring.

A purge operation begins with the Active Monitor placing a purge frame on the ring and then stripping everything off the ring that it receives. The Active Monitor may transmit multiple purge frames or it may transmit idle frames to fill the ring while it continues stripping everything, including the token, from the ring. When the Active Monitor receives one of its purge frames, indicating that it has essentially filled the ring with the purge and idle frames, it re-initializes the ring and issues a new token. Thus each purge operation causes the loss of all data then on the ring. In contrast, the purge operation described and claimed in the cross-referenced applications minimizes the loss of data on the ring and does not require ring re-initialization or interruption of ring operation.

The purge operation described above may be used only with ring protocols which allow markers to be placed at the beginning of a frame, for example, the IEEE 802.5 protocol. Prior to the inventions described in the cross-referenced applications, protocols such as the ANSI Fiber Distributed Data Interface (FDDI) protocol, which do not allow frame markers at the start of frames, did not have any mechanism to handle no-owner frames. The mechanism of the present invention may be used with any token ring protocol and any frame format.

Although the cross-referenced applications solve most of the problems relating to removal of no-owner frames from the network, there are two important aspects of no-owner frame stripping that these applications did not consider. First, when a token ring network is completely "idle," there is no need to purge no-owner frames, and in some cases it is disadvantageous to run a purging operation continually when the ring is idle. The purging operation requires the transmission of one or more void frames in each cycle, and the rate at which these void frames are generated can be as high as 333,000 frames per second. The term "idle ring" may be defined in various ways, as will be explained in more detail below.

The second, and related problem is that it may not be desirable to run a purging operation when the ring is near fully loaded. As with the term "idle" the term "near fully loaded" may be defined in different ways, but the same principle applies in each case. As will be explained in the detailed description below, the transmission of void frames during the purging operation uses a small fraction of the usable bandwidth of the ring. Moreover, if the ring is near fully loaded there is a higher probability that any no-owner frames will be stripped off without need for a purging station, by another station ,that is currently holding the token in normal operation, and is stripping incoming data while it transmits. Therefore, there is a need for further improvement in the purging of no-owner frames from token ring networks The present invention is directed to this end.

SUMMARY OF THE INVENTION

The present invention resides in a method and apparatus for purging unwanted no-owner frames from a token ring network, but automatically discontinuing the initiation of purge cycles if the network is deemed to be idle or if the network is deemed to be near fully loaded.

Some preliminary definitions may help to clarify the summary that follows. First, a purge cycle is a set of operations that occurs in a purging station and serves to strip unwanted information from the network. A purge cycle begins after receipt of a token and if a decision is made to initiate purging. The purge cycle ends when the purging station receives one of its own error-free purge marker frames, or next receives a token, or detects ring re-initialization. A token cycle is defined as the elapsed time between two successive token detections. A usable token is one received by a station that has one or more frames to transmit, at a time when the network protocols allow the station to transmit one or more of the outstanding frames.

Briefly, and in general terms, the method of the invention comprises the steps of receiving information on the ring network; capturing from the ring network a token received in the receiving step; transmitting data frames, if any, onto the ring network after capturing the token; transmitting a predetermined number of purge marker frames onto the ring network after capturing the token and transmitting any data frames; and transmitting a token onto the ring network after the purge marker frames have been transmitted. Then the method includes determining whether to initiate a purge cycle; and initiating a purge cycle, if necessary, beginning when the received token is removed from the ring network and when the step of determining whether to initiate a purge cycle has concluded in the affirmative, and ending upon detection of a terminatepurge flag being set. During the purge cycle, all data frames and fragments of frames received by the receiving means are removed from the network. The method further includes the step of setting the terminate-purge flag, responsive in part to the detection of at least one purge marker frame received in the receiving step. The critical step of determining whether to initiate a purge cycle includes determining if the ring network is not idle, wherein the purge cycle is initiated only when the ring network is not idle.

Determining whether to initiate a purge cycle also preferably includes the step of determining if the ring network is near fully loaded. A purge cycle is not initiated if the ring network is near fully loaded. In the preferred embodiment of the invention, determining if the ring network is near fully loaded is effected by detecting the late arrival of a token, which is indicative of a fully loaded token cycle. A token is said to be late if the token cycle is longer than some predetermined time interval, which is preferably the Target Token Rotation Timer (TTRT) time for the ring.

In the preferred implementation of the invention, an idle ring is defined in terms of an idle token cycle. The steps needed to determine if a purge cycle is to be initiated include determining if the received token is usable, detecting completion of a ring initialization procedure, detecting receiving or repeating a frame other than an error-free purge marker frame, detecting a frame fragment longer than a preselected length, or detecting a frame format error.

In terms of apparatus, the purging station includes receiving means for receiving information on the ring network; token capturing means for removing from the ring network a token received by the receiving means; data frame transmitting means, for transmitting data frames, if any, onto the ring network; marker transmitting means for transmitting a predetermined number of purge marker frames onto the ring network after capturing the token; and token transmitting means for transmitting a token onto the ring network after the purge marker frames have been transmitted. More importantly, the station includes purging means, including means for determining whether to initiate a purge cycle based on the occurrence of selected conditions, wherein the purge cycle, if initiated, begins when the received token is removed from the ring network and ends when a terminate-purge flag is set, and wherein during the purge cycle the purging means removes all data frames and fragments of frames received by the receiving means. The apparatus further includes means for generating the terminate-purge flag, responsive in part to the detection of at least one purge marker frame received by the receiving means. The means for determining whether to initiate a purge cycle includes means for determining when the ring network is not idle, wherein the purge cycle is initiated only when the ring network is not idle.

The apparatus may further include means for determining when the ring network is near fully loaded; wherein the purge cycle is not initiated when the ring network is near fully loaded. Other variations of the apparatus are possible, consistent with the various forms of the corresponding method described above.

It will be appreciated from the foregoing that the present invention represents a significant advance in the field of token ring networks In particular, the invention provides for the automatic disabling of purging no-owner frames from the network when it is idle, or when it is nearly fully loaded. Other aspects and advantages of the invention will become apparent from the following more detailed description, taken in conjunction with the accompanying drawings.

DESCRIPTION OF THE PREFERRED EMBODIMENT

1. Operation of a Conventional Token Ring

Figure 1:
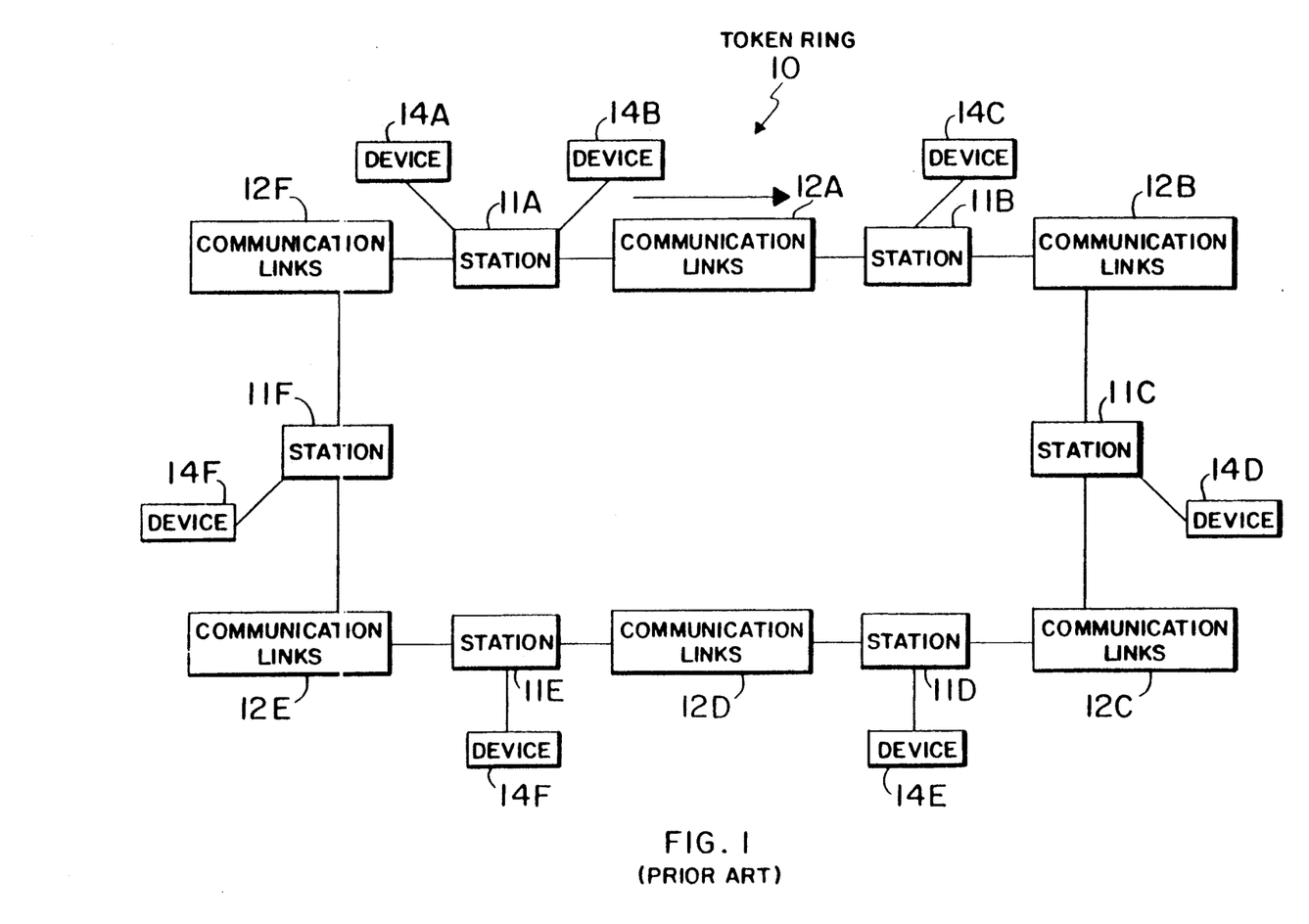
FIG. 1 depicts a functional block diagram of a conventional token ring network.

With reference to FIG. 1, a token ring 10 includes a plurality of stations 11A through 11F connected by communication links 12A though 12F. The stations 11 couple one or more devices 14A through 14F to the ring. The devices 14 may be of diverse types, including data processors, mass storage devices, telecommunications links, printers, and so forth, all of which may transmit information to, or receive information from, other devices in the ring 10 over communication links 12.

Figure 2:
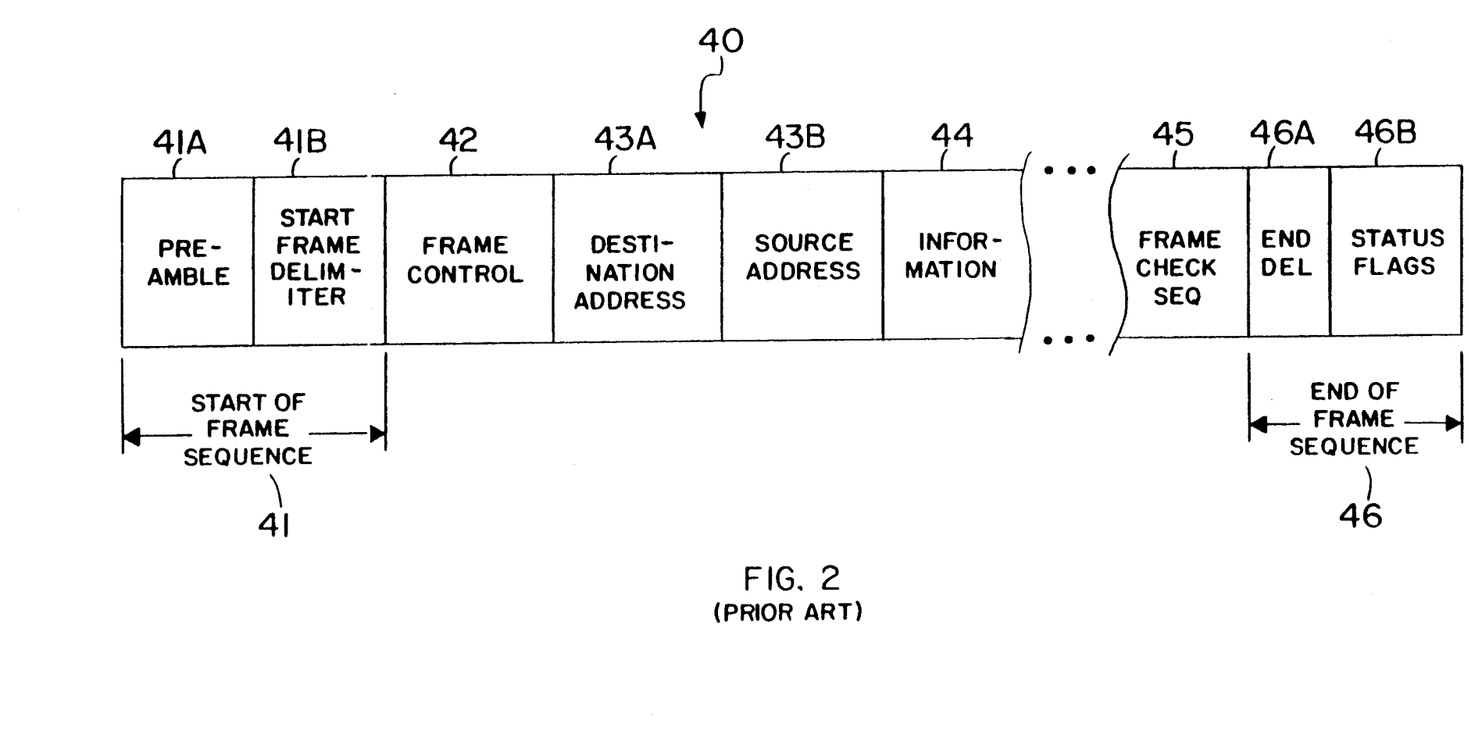
FIG. 2 is an illustration of a conventional information frame used in the network shown in FIG. 1.

The stations 11 transmit information over the communication links 12 in the form of frames, the connection with FIG. 2. Communication between two stations on the ring occurs when, for example, one station 11 ( e.g., 11A) transmits a frame to another station 11 (e.g., 11E). To accomplish this, the transmitting station 11A transmits a signal comprising a bit stream forming the frame to another station 11B (following the direction of the arrow) over the communication link 12A interconnecting the two stations. The station 11B that receives a bit stream from the transmitting station 11A repeats the frame over the communication link 12B which interconnects it and another station 11C.

This process is repeated by each of the other stations 11C-F until the frame is returned to the original transmitting station 11A. Essentially, each of the stations receives a signal over a communication link 12 interconnecting it and a preceding station 11, and transmits a signal over another communication link 12 interconnecting it and a succeeding station 11. If a station 11 is an intended recipient of the frame (e.g., 11E), then in addition to repeating the frame to its downstream station 11, it also retains a copy of the frame for processing by one or more of the devices 14 connected to it.

The determination of whether a station 11 may transmit a frame to the ring is based on whether the station holds a token. A token is a special sequence of bits which the stations transmit around the ring to indicate a transmit opportunity. If station 11 needs to send a frame, when the token reaches it, it does not repeat the token, thereby capturing the token and becoming its holder. The station 11 then transmits one or more frames. After completing the transmission of the frame(s), the station 11 resumes transmission of the token around the ring in accordance with the ring protocol. Other stations on the ring may then capture the token and transmit frames.

When a station 11 receives a frame which it originated, other than the token, it strips the frame from the ring 10. Thus a frame is transmitted around the ring, that is, repeated from station to station, only once. If the originating station does not strip one of its frames, the frame will continue to circulate around the ring. This causes the intended destination station to receive the frame over and over again. The time required for such a frame to circulate around the ring is generally much shorter than the average rate at which new frames arrive at a destination station. Thus the destination station receives this circulating frame at a faster rate than it ordinarily receives frames, and it must process these frames more quickly also. This results in additional station processing overhead and, possibly, station errors.

As noted above, information is transferred in the form of frames, the structure of which is shown in FIG. 2. With reference to FIG. 2, a frame 40 is divided into several fields. The start of a frame is denoted by a preamble field 41A and a start frame delimiter field 41B which further denotes the beginning of the portion of the frame containing the frame information. These fields are generally referred to as a start-of-frame sequence 41.

Immediately following the start-of-frame sequence 41 is a frame control field 42 detailing whether the bit stream is a token or a frame and, if it is a frame, what type of frame it is. The possible types of frames include, for example, data frames (frames used to send a message from one station to another), claim token frames, beacon frames, purge marker frames, and void frames (which may be used as purge marker frames). The next two fields are address fields 43A-B, namely, a destination address field DA 43A whose contents identify the intended recipient(s) of the frame and a source address field SA 43B whose contents identify the source station. The information field 44 follows the address field 43, and is in turn followed by a frame check sequence field 45 containing an error detection sequence used by the receiving stations to detect errors in any of the frame control field 42, the address fields 43 and the information field 44.

The end of the frame is denoted by an end-of-frame sequence 46. The sequence 46 includes an end delimiter field 46A, which defines the end of a frame, and a frame status flag field 46B containing a set of status flags. The status flags are conditioned by stations including the source station to provide status information to the destination and source station. This information may include, for example, whether the frame was copied by the intended destination station(s), whether any errors have been detected, and so forth.

If a station 11 recognizes the contents of the frame destination address field 43A as one of its own addresses, that is, either its station-address or one of its other associated addresses, it copies the frame for processing by its attached device(s) 14. It also repeats the frame to the next station in the ring as set forth above.

When a frame returns to its source station, the station recognizes the contents of the frame source address field 43B as its own address, and strips (removes) the rest of the frame from the ring. When a frame is thus stripped, the start-of-frame sequence 41, the frame control field 42 and part of the address fields 43 remain. These fragments are ignored by the stations on the ring because they do not form a complete frame. They are stripped from the ring when they encounter a station in the act of transmitting or a purging station.

If the source address field 43B is altered due to errors as the frame travels around the ring, the source station may not recognize the frame as its own. Thus the source station will not strip it. The frame then travels around the ring, as a no-owner frame, requiring duplicative processing by the stations listed as destination stations. Similarly, if a source station becomes inoperative after transmitting frames, the frames are not recognized by any operating stations and thus the frames are not stripped. These frames also travel around the ring as no-owner frames requiring duplicative processing. To avoid such duplicative processing, a ring purging mechanism is utilized.

2. The basic purging mechanism

Two principal embodiments of the purging mechanism were disclosed in the cross-referenced applications. One embodiment uses purge marker frames without sequence numbers and the other uses purge marker frames with sequence numbers. As will shortly become apparent the improvements of the present invention are equally applicable to both embodiments. However, for brevity only the simpler embodiment, in which sequence numbers are not used, is illustrated in this specification. The ring purging operation of the present invention is performed by one or more stations which are elected as ring purging stations after the ring is initialized. Preferably, only one station is elected as a purging station, in accordance with the procedures described in the cross-referenced applications. The present invention is not concerned with the ring purger selection process, which, therefore, will not be described.

When a station is functioning as a purging station, it is said to be in the "purge mode on" state. Otherwise, it is in the "purge mode off" state. Equivalently, the station's purge mode is said to be "on" or "off," respectively. A station performs the purging process described below only while it is in the "purge mode on" state.

Prior to this invention, a purging station would perform purging operations during normal operation of the ring, i.e., whenever there is a token circulating on the ring and the ring is not undergoing initialization. In accordance with the invention, a purge cycle is not initiated if the ring is idle, that is if it contains essentially only a circulating token and possibly some relatively short frame fragments. In a related aspect of the invention, a purge cycle is not initiated if the ring is heavily loaded. How these two improvements are implemented can best be understood if the basic purging mechanism, without the improvements, is first explained.

The purging stations discussed below transmit, receive, and strip frames and tokens using conventional circuitry. Each station performs these tasks following the operating protocol of the ring For example, a station on a ring following the ANSI FDDI protocol includes circuitry to transmit, receive and strip frames and tokens according to the ANSI FDDI Token Ring Media Access Control (MAC) Specification ANSI X3.139-1987. During a purge operation, the stations may perform conventional stripping operations and strip received frames after examining the frame source address or they may strip all information from the ring as discussed below.

Figure 3:
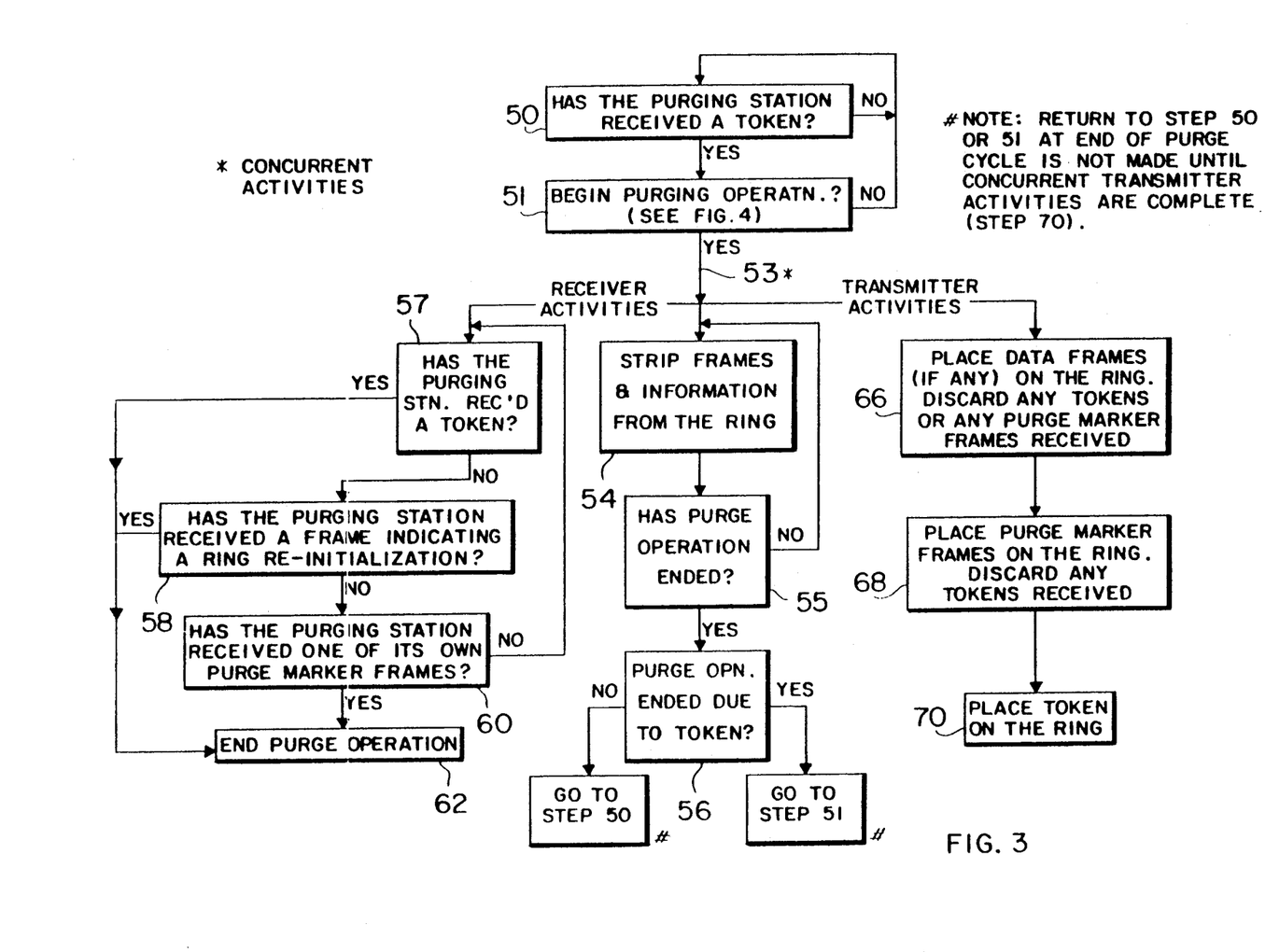
FIG. 3 is a flow chart depicting the operation of a station functioning as a purging station on a typical ring, in accordance with an illustrative embodiment of the present invention.

An assumption is made in FIG. 3 that the ring is relatively large, i.e. a typical ring of which the latency is greater than the time needed to transmit a selected number of void frames, needed as part of the purging operation, plus the time needed to transmit a token. To accommodate a configuration in which the ring were smaller than this would require a more complex flowchart, which would unnecessarily complicate this description. However, the mechanism of the invention will operate in a ring of any size.

As shown in FIG. 3, a purging station begins a purge operation, or purge cycle, when it receives a token, as detected in step 50. If a token is not detected, purging is not initiated and step 50 is repeated. If a token is detected, step 51 determines whether purging should be initiated after detection of a token. If it is determined in step 51, as detailed in FIG. 4, that purging should not be initiated, step 50 is repeated. If a token is received and step 51 determines that purging should be initiated, a purge cycle is initiated. As indicated at 53, during the purge cycle three activities proceed concurrently: receiving activities, transmitting activities and stripping activities.

When the purging station enters the purge cycle, it begins to strip all frames and information received from the ring, as indicated in step 54. The purging station continually checks to see whether the purge cycle should be ended, as in step 55, and if so determines in step 56 whether the purge cycle was ended as a result of detecting a token. As will be described shortly with reference to the receiving activities, detection of a token is one of three events that can terminate the purge cycle. If this is the case, the station returns to step 51 to determine if another purge cycle should be initiated. If the purge cycle was terminated for other reasons, the next action of the purging station is to perform step 50 again, to wait for detection of another token, which signals the possible start of another purging cycle.

The transmitting activities of the purging station during the purge cycle include transmitting, in sequence, (i) any data frames it has to transmit, as indicated in step 66, (ii) one or more purge marker frames, as indicated in step 68, and (iii) the token, as indicated in step 70. The purge marker frames, which are preferably void frames, uniquely identify the purging station as the source, so that they may be recognized by the purging station when they are received, but are ignored by other stations in the ring. They are the principal mechanism employed by the purging station to end the purge cycle.

The receiving activities of the purging station include checking for receipt of a token (step 57), which is one of three possible events that will end the purge cycle. First, the detection of a token in step 57 means that, if only one token is circulating, the purge marker frames have returned to the purging station undetected, and the purge cycle should be ended. The existence of multiple tokens is another possibility and this subject was discussed in cross-referenced application Ser. No. 07/558,961. For present purposes it is assumed that there is only one circulating token If the purging station has received a frame indicating a ring re-initialization (step 58), or if the purging station has received one of its own error-free purge marker frames (step 60), the purge cycle will be ended (step 62). Otherwise, receiver processing continues with step 57 again, until such time that a token is received, or one of the purging station's own purge marker frames is received, or the ring is re-initialized.

A preferred embodiment of the purging mechanism uses purge marker frames with sequence numbers that associate each purge marker frame with a particular purge cycle. Basically, this embodiment involves two additional steps to those shown in FIG. 3. When transmitting, the purger station increments a purge marker frame counter prior to transmitting its purge marker frames, and includes the new value of the counter in the purge marker frames. A preferred approach is to use a binary counter for the purge marker frame counter, with a count value of one or zero. The other additional step is to check the sequence number when receiving a purge marker frame, in step 60. If the sequence number of the received purge marker frame is correct, the purge cycle is ended normally. If it is incorrect, this is an indication that there is more than one token circulating on the ring, and the error is treated the same way as if a duplicate token had been detected, as described in the cross-referenced applications. Apart from these differences, the purging mechanism proceeds in the same manner as shown in FIG. 3. As mentioned earlier, the improvement with which the present invention is concerned operates either with or without sequence numbers in the purge marker frames.

3. Automatic Deactivation of Purge Cycle Initiation:

When the ring is idle, that is, when nothing should be circulating on the ring but a single token and possibly one or more short fragments, there is no need for the purging station to initiate a purge cycle every time the token is detected. The purge cycle requires the transmission of one or more purge marker frames in each cycle. These frames may be specifically designated purge marker frames or, preferably, void frames may be used as purge marker frames. The rate at which these void frames are generated can be as high as 333,000 frames per second. On an idle ring, these frames are transmitted using the excess bandwidth capacity of the ring, and has no bandwidth loss for any station. Even on a near-fully loaded ring, the effect on usable bandwidth is only about 0.22% at worst. Since the ANSI FDDI MAC Standard explicitly inhibits the reception of void frames, it might be thought that the unwanted circulation of void frames on an otherwise idle ring could not do much harm. However, some products intended for FDDI use do not adhere closely to the standard, and are seriously and adversely affected by the high rate of occurrence of void frames when the ring is otherwise idle. Thus, although the operations of the ring purging mechanism benefit the ring's operation, by stripping the ring of no-owner frames and frame fragments, the mechanism may also have an adverse effect on ring operation, especially if multiple equipment vendors are involved. The present invention provides for automatically ceasing ring purging operations, or more precisely, not initiating further purge cycles, when the ring is detected as being idle. More precisely, the invention detects an "idle token cycle." A token cycle is the time between the receipt of successive tokens at a given point in the ring, such as the purging station. An idle token cycle is one having a length equal to the actual ring latency. In the invention as presently implemented, the detection of an idle token cycle with no no-owner frames or long fragments results in not initiating a purge cycle. The detection of a no-owner frame or a long fragment in an idle token cycle results in the initiation of a purge cycle.

Another aspect of the invention involves the ability to automatically deactivate the purging mechanism when the ring is near fully loaded, or, more precisely, when the token cycle is fully loaded. If a token cycle is longer than twice the ring latency, then any no-owner frames and fragments that may have been present on the ring prior to the token cycle are guaranteed to have been removed, during the token cycle. Furthermore, the Target Token Rotation Timer (TTRT) time for the ring is guaranteed to be longer than twice the ring latency. Therefore, if a token cycle is longer than the TTRT time, then no-owner frames and fragments that may have been present on the ring prior to the beginning of the token cycle are removed. For purposes of this invention, if a token cycle is equal to or longer than a TTRT time, the token is said to be late and the token cycle is said to be fully loaded.

When the token cycle is fully loaded, there is no need to perform a purge cycle because any no-owner frames that are circulating on the ring are guaranteed to be removed. This is because, as the ring becomes more fully loaded, it is increasingly likely that a no-owner frame will arrive at a transmitter that is still holding the token. In normal operation under the ring protocols, a frame that arrives at a station that is in the act of transmitting data, while holding the token, will be stripped automatically. If purge cycles are continually initiated in this circumstance, the time needed to transmit two or more purge marker frames must be included in the allocated synchronous bandwidth of the ring. The advantage of deactivating the purge cycle automatically when the token cycle is fully loaded is that the usable bandwidth on the ring is not lost. If the purge cycle is enabled on every token rotation on a near fully loaded ring, in the worst case about 0.22% of the bandwidth usable by stations is lost due to the presence of purge marker frames. Since the token cycle is fully loaded, no-owner frames arriving at a transmitting station that is currently holding the token will be stripped. As a result, there is no need for a purger to be active during these periods. Because of the reduced criticality of having a purger active, and the resulting performance benefit, we include a mechanism to disable the initiation of a purge cycle on ring in which the token cycle is fully loaded.

Figure 4:
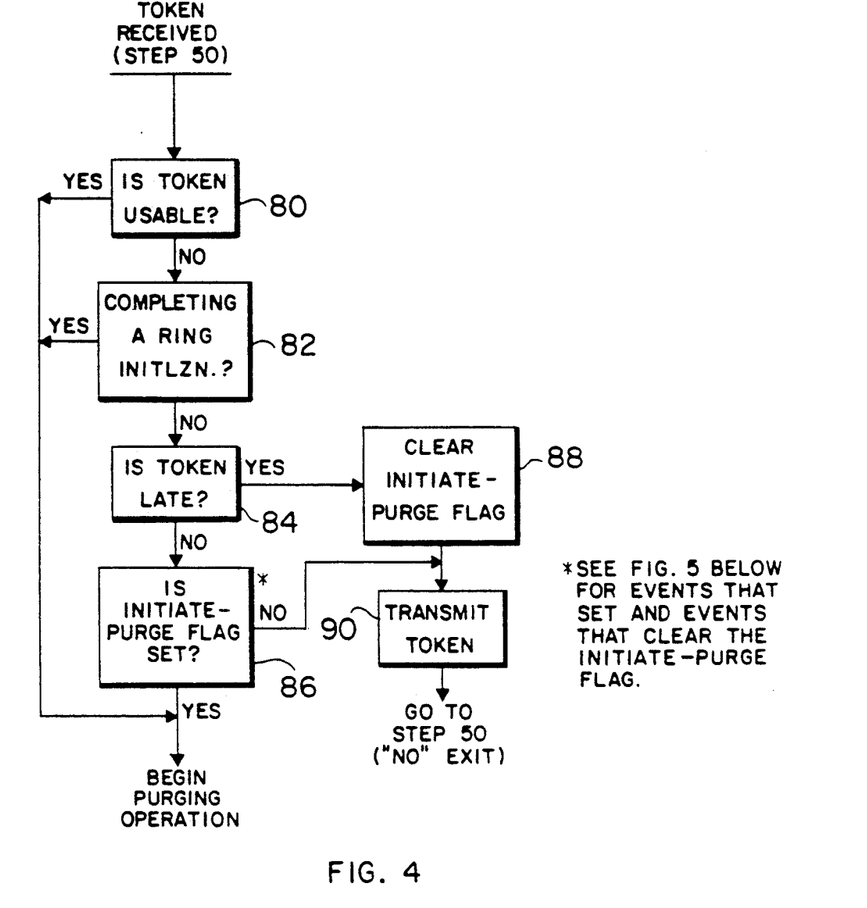
FIG. 4 is a flow chart expanding step 51 of the flow chart of FIG. 3.
Figure 5:
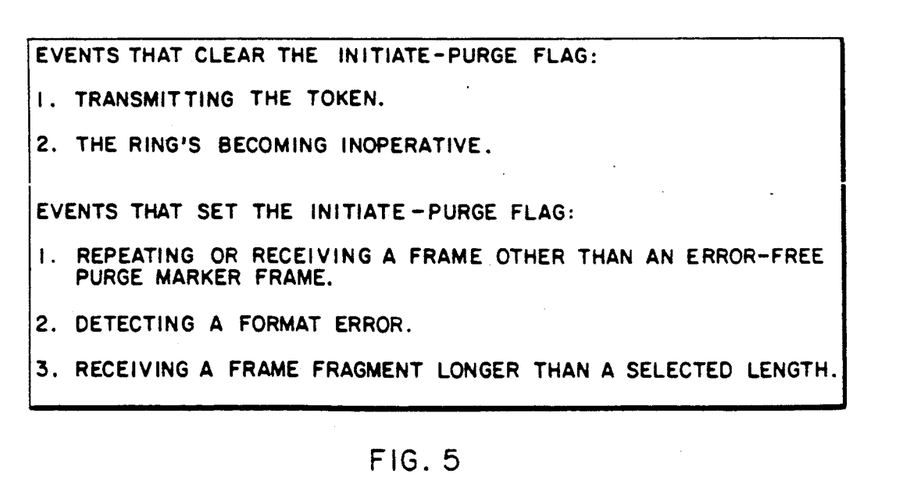
FIG. 5 is a table listing the events that set and clear a purge-initiate flag used in FIG. 4.

Implementation of both the described new features make use of a flag referred to as the initiatepurge flag. A new purge cycle will be initiated only if the initiate-purge flag is set. The occurrence of various events clear the flag, and the occurrence of various other events set the flag, as indicated in FIGS. 4 and 5.

When a token is received, as detected in step 50 (FIG. 3), the first question posed is whether the token is "usable." A usable token is one received by a station that has one or more frames to transmit, at a time when the network protocols allow the station to transmit one or more of the outstanding frames. A more specific definition of a usable token can be found by reference to the appropriate standards document, such as the ANSI FDDI MAC standard if the network is an FDDI ring. If the token is usable, as determined in step 80, the purging station will begin a purge cycle, as indicated by the concurrent paths 53 in FIG. 3.

If the token is not usable, step 82 determines whether the network is completing ring re-initialization. If so, a purge cycle is also initiated. If not, step 84 determines whether the received token was late arriving. If the token was not late, the final check, in step 86, is to determine whether the initiate-purge flag is set. If the flag is set, this indicates that, for purposes of ring purging, the ring is not considered to be idle and a purge cycle should be initiated.

If the token is detected as being late, in step 84, the initiate-purge flag is cleared, in step 88, and a token is transmitted, as indicated in step 90. A late token indicates a near fully loaded ring, a condition in which no further purge cycles will be initiated until the condition changes. In the presently preferred embodiment of the invention, a token is late of the token cycle is longer than a TTRT time. If the token is not late, as determined in step 84, and if the initiate-purge flag is not set, as determined in step 86, a token is transmitted (step 90).

The effect of the steps shown in FIG. 4 is either to initiate a new purge cycle, or to transmit a token and not initiate a new purge cycle (if the received token was late or if the initiate-purge flag was not set). The initiate purge flag is cleared on sending a token, either in step 90 or in step 70 of FIG. 3, and is also cleared if the ring is detected as becoming inoperative. Certain other conditions, if detected, set the initiate-purge flag during the ensuing token cycle. Specifically, the flag is set when the purging station: (1) repeats or receives a frame other than an error-free purge marker frame, (2) detects a format error, or (3) receives a frame fragment longer than a selected length, such as seventeen bytes.

If the purging station receives or repeats a frame other than one of its own error-free purge marker frames, this indicates that more than simply a token and void frames are circulating on the ring. Therefore, purge cycles should continue to be initiated. Similarly, detection of a frame format error, or of a frame fragment greater than a predetermined length (e.g., seventeen bytes in length), indicates that purge cycles should continue to be initiated.

Two other conditions cause the subsequent initiation of a purge cycle: the receipt of a usable token and the detection of ring initialization completion. However, in the implementation illustrated, these conditions do not set the initiate-purge flag. Instead, they are detected in steps 80 and 82 and cause immediate initiation of the purge cycle, regardless of whether or not the token is late.

It will be appreciated from the foregoing that the present invention provides a further significant advance in the field of token ring networks. In particular, the invention enhances operation of a station selected to purge unwanted no-owner frames from the ring. The selected station automatically discontinues the initiation of purge cycles in the event that the ring is free of no-owner frames or long fragments, or in the event that the ring is near fully loaded. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A station for purging no-owner frames from a token ring network, comprising:
   receiving means for receiving information on the ring network;
   token capturing means for removing from the ring network a token received by the receiving means;
   data frame transmitting means, for transmitting data frames, if any, onto the ring network;
   marker transmitting means for transmitting a predetermined number of purge marker frames onto the ring network after capturing the token;
   token transmitting means for transmitting a token onto the ring network after the purge marker frames have been transmitted;
   purging means, including means for determining whether to initiate a purge cycle based on the occurrence of selected conditions, wherein the purge cycle, if initiated, begins when the received token is removed from the ring network and ends when a terminate-purge flag is set, and wherein during the purge cycle the purging means removes all data frames and fragments of frames received by the receiving means; and
   means for generating the terminate-purge flag, responsive in part to the detection of at least one purge marker frame received by the receiving means;

and wherein the means for determining whether to initiate a purge cycle includes means for determining when the ring network is not idle, wherein the purge cycle is initiated only when the ring network is not idle.

2. A station as defined in claim 1, wherein the means for determining whether to initiate a purge cycle further includes:

means for determining when the ring network is near fully loaded; wherein the purge cycle is not initiated when the ring network is near fully loaded.

3. A station as defined in claim 2, wherein the means for determining when the ring network is near fully loaded includes means for detecting the late arrival of a token, which is indicative of a fully loaded token cycle.

4. A station as defined in claim 3, wherein the means for detecting the late arrival of a token deems a token to be late if the token cycle is longer than a predetermined time interval.

5. A station as defined in claim 4, wherein the predetermined time interval is greater than or equal to a Target Token Rotation Timer (TTRT) time for the ring.

6. A station as defined in claim 2, wherein the means for determining when the ring network is near fully loaded includes means for measuring the token cycle between two successively received tokens, wherein the ring network is considered near fully loaded when the token cycle is greater than or equal to twice the latency of the ring.

7. A station as defined in claim wherein the means for determining whether to initiate a purge cycle includes:

means for determining if the received token is usable.

8. A station as defined in claim 1, wherein the means for determining whether to initiate a purge cycle includes:

means for detecting completion of a ring initialization procedure.

9. A station as defined in claim wherein the means for determining whether to initiate a purge cycle includes:

means for detecting receiving or repeating a frame other than an error-free purge marker frame.

10. A station as defined in claim 1, wherein the means for determining whether to initiate a purge cycle includes:

means for detecting a frame fragment longer than a preselected length.

11. A station as defined in claim 1, wherein the means for determining whether to initiate a purge cycle includes:

means for detecting a frame format error.

12. A station as defined in claim 1, wherein the means for determining whether to initiate a purge cycle includes:

an initiate-purge flag;

means for clearing the initiate-purge flag when a token is transmitted by the station; and means for setting the initiate-purge flag when the receiving means detects a condition indicative of a need to initiate a purge cycle.

13. A station as defined in claim 12, wherein the means for setting the initiate-purge flag includes:

means for setting the initiate-purge flag upon receipt of a frame other than an error-free purge marker frame;

means for setting the initiate-purge flag upon detection of a format error; and means for setting the initiate-purge flag upon receipt of a frame fragment longer than a preselected length.

14. For use in a station for purging non-owner frames from a token ring network, a method comprising the steps of:

receiving information on the ring network;

capturing from the ring network a token received in the receiving step;

transmitting data frames, if any, onto the ring network after capturing the token;

transmitting a predetermined number of purge marker frames onto the ring network after capturing the token and transmitting any data frames;

transmitting a token onto the ring network after the purge marker frames have been transmitted;

determining whether to initiate a purge cycle;

initiating a purge cycle, if necessary, beginning when the received token is removed from the ring network and when the step of determining whether to initiate a purge cycle has concluded in the affirmative, and ending upon detection of a terminate-purge flag, wherein during the purge cycle all data frames and fragments of frames received by the receiving means are removed from the network; and setting the terminate-purge flag, responsive in part to the detection of at least one purge marker frame received in the receiving step;

and wherein the step of determining whether to initiate a purge cycle includes determining if the ring network is not idle, wherein the purge cycle is initiated only when the ring network is not idle.

15. A method as defined in claim 14, wherein the step of determining whether to initiate a purge cycle includes:

determining if the ring network is near fully loaded, wherein a purge cycle is not initiated if the ring network is near fully loaded.

16. A method as defined in claim 15, wherein the step of determining if the ring network is near fully loaded includes detecting the late arrival of a token, which is indicative of a fully loaded token cycle.

17. A method as defined in claim 16, wherein the step of detecting the late arrival of a token deems a token to be late if the token cycle is longer than a predetermined time interval.

18. A method as defined in claim 17, wherein the predetermined time interval is greater than or equal to a Target Token Rotation Timer (TTRT) time for the ring.

19. A method as defined in claim 15, wherein the step of determining when the ring network is near fully loaded includes measuring the token cycle between two successively received tokens, wherein the ring network is considered near fully loaded when the token cycle is greater than or equal to twice the latency of the ring.

20. A method as defined in claim 14, wherein the step of determining whether to initiate a purge cycle includes:

determining if the received token is usable.

21. A method as defined in claim 14, wherein the step of determining whether to initiate a purge cycle includes:

detecting completion of a ring initialization procedure.

22. A method as defined in claim 14, wherein the step of determining whether to initiate a purge cycle includes:

detecting receiving or repeating a frame other than an error-free purge marker frame.

23. A method as defined in claim 14, wherein the step of determining whether to initiate a purge cycle includes:

detecting a frame fragment longer than a preselected length.

24. A method as defined in claim 14, wherein the step of determining whether to initiate a purge cycle includes:

detecting a frame format error.

25. A method as defined in claim 14, wherein the step of determining whether to initiate a purge cycle includes:

clearing an initiate-purge flag when a token is transmitted by the station, at the start of a token cycle;

monitoring the ring network for the occurrence of a condition indicative of the need to initiate a purge cycle; and setting the initiate-purge flag when the receiving means upon detection of a condition indicative of the need to initiate a purge cycle.

26. A method as defined in claim 25, wherein the step of monitoring the ring network includes:

checking for the receipt of a frame other than an error-free purge marker frame;

checking for the occurrence of a format error; and checking for the arrival of a frame fragment longer than a preselected length.

* * * * *